Patented Oct. 31, 1944

2,361,418

UNITED STATES PATENT OFFICE 2,361,418

ADHESIVE COMPOSITION

John E. Robinson, Glen Ellyn, Ill., assignor to American Can Company, New York, N. Y., a corporation of New Jersey No Drawing. Application February 26, 1941, Serial No. 380,737

2 Claims. (Cl. 260—27)

The present invention relates to a special adhesive which is adaptable for use with fibrous materials or other substances to provide tight seams or joints which will not pull lose or open up when subsequently subjected to ordinary temperatures or to reasonable handling, and the invention has particular reference to thermoplastic cement or adhesive made up of resins properly mixed together and without the use of solvents.

Vinyl and other resins have been used in adhesives in connection with suitable solvents. A prolonged drying time is required to dry off the solvents. Where the adhesive is used on fibrous material it is necessary to subject the fibre or paper to the heat of drying. This drying is injurious to the paper because the time and temperature required materially reduce the moisture content of the paper, making it lifeless. Such drying also distorts the paper out of shape and this presents problems of proper handling. There is also consequent waste of materials.

There is another serious difficulty in the use of solvent adhesive where the paper stock containing the adhesive is involved in the manufacture of containers for food products. Under commercial drying conditions for fibrous stock there is always the danger of some solvent being trapped and not properly eliminated. The result is a more or less vital danger of off-taste and odors as imparted by any slight traces of improperly dispersed solvent.

High speed production, the modern essential of manufacture, accentuates the problems. In the interest of time saving higher drying heats are employed and the difficulties are multiplied many times.

The present invention contemplates the production of a thermoplastic adhesive without the use of solvents of any kind and includes the mixing together of resinous ingredients at elevated temperatures as by a kneading action. Such an adhesive when used on fibrous material does not require any destructive drying out or elimination of moisture from the fibrous stock and having no solvents the problem of imparted off-taste or odors is not present.

An object of the invention is the provision of a method of preparing a special thermoplastic adhesive for use on fibrous materials to hold the fibrous parts in close bonded relation and to create a joint which will not be disturbed by subsequent heating at reasonable temperatures as for example 200° F. or less.

Another object is the provision of a method of joining fibrous surfaces in a secured joint by the use of a mixture of polymerized vinyl acetate and a pine pitch residue obtained from gasoline or benzol extraction.

Yet another object is the provision of steps for a method of manufacturing fibrous containers for food stuff and the like in which a thermoplastic adhesive is used which will not impart an off-taste or an odor to the product packed in the finally completed container.

Numerous other objects and advantages of the invention will be apparent as it is better understood from the following description which is of a preferred embodiment thereof.

The thermoplastic adhesive of the present invention may be used in the manufacture of fibre containers such as shown, for example, in the J. M. Hothersall Patent Number 2,085,979, issued by the United States Patent Office on July 6, 1937, and such a use will be hereinafter referred to as it provides an excellent example for showing many of the advantages inherent in the thermoplastic adhesive of the invention.

In the Hothersall container the body is formed into tubular shape and the edges of the fibre blank from which the body is made are brought together in lapped relation. A sealed joint is made of these lapped parts by squeezing them together with the thermoplastic adhesive interposed between the laps. At the time of sealing the adhesive is in heated or plastic condition and while tacky, the overlapped edges are firmly pressed together. This may be done by suitable die parts, rollers or the like which may be heated or cooled as required in order to produce the desired bond of the fibre sections. The ends of the Hothersall container are similarly secured to the body.

After this forming of the adhesive joints the container is liquid proofed by immersion in melted paraffin which may be maintained at as high a temperature as 190° F. The seams are in direct contact with the hot liquid and are subject to the high temperature, sometimes for an appreciable length of time. The thermoplastic adhesive of the present invention withstands such drastic action and the joints secured thereby remain tight and are unaffected. This example of one use of the present adhesive presents a concrete picture which it is believed will show some of the problems which are solved by this special adhesive.

The thermoplastic of the present invention in a preferred form consists of about sixty percent polymerized vinyl acetate and about forty percent of a pine pitch resin derived from gasoline or benzol extraction such as is mentioned in the Fred H. Lane Patent Number 2,114,392, on Plasticized pine wood pitch and method of producing, issued by the United States Patent Office April 19, 1938. This pine pitch resin will be referred to in the claims as extracted pinewood pitch resin, characterized by substantial insolubility in cold petroleum hydrocarbons.

In making up the thermoplastic adhesive some consideration must be had to the use for which the adhesive will be subsequently directed. In providing a thermoplastic adhesive suitable for the manufacture of the Hothersall container previously referred to by way of example, forty parts of pine pitch resin derived from gasoline and benzol extraction, which will be designated extracted pinewood pitch resin, and sixty parts of polymerized vinyl acetate are found to provide an excellent seam holding adhesive.

These materials are put into a mixing mill where they are held at temperatures varying from 250° F. to 350° F. while being completely kneaded and thoroughly mixed for substantially fifty or sixty minutes. The resulting mixture is kept hot and in a viscous, fluid state. As such it is in satisfactory condition to be applied to the fibrous surface. For applying to the surface to be secured together the adhesive is preferably introduced into a tank or suitable vessel which is maintained at a temperature of from 350° F. to 450° F. Application to the surface of fibrous stock for example may be made by passing the stock over adhesive applying rollers which may be located in the tank and which rotate in the heated liquid.

The adhesive when applied as a thin film on the fibrous surface will set or harden substantially immediately. Artificial cooling may be used if desired. Such cooling would be used where only very short setting time is available as in high speed production but the adhesive film being thin will of itself be quick setting.

Continuing with the example of manufacture of the Hothersall can, the edges of the blank to which this adhesive has been applied will next be brought together. This may be between heated surfaces or the adhesive may be softened by heat and the joint made under a pressure exerted in suitable manner as by dies or rollers. This forms the seal or tight joint desired and the pressure members may then be immediately backed off or removed from the body.

Other materials may be added to the resinous ingredients entering into the thermoplastic cement if desired but such additions will not be in the nature of solvents. Different quantities of gums may also be used other than the proportions given.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A thermoplastic adhesive sealing composition for securing together fibre container joints and for similar purposes, comprising in combination a homogeneous mixture of substantially sixty percent by weight of polymerized vinyl acetate and substantially forty percent by weight of pine wood pitch characterized by low solubility in petroleum hydrocarbons and comprising a petroleum hydrocarbon insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin, said adhesive sealing composition having adhesion and sealing stability up to substantially 200 degrees Fahrenheit.

2. The process of preparing a thermoplastic adhesive designed to permanently seal the joints of containers constructed of fibrous material which will not give way when subjected to immersion in molten paraffin at a temperature of substantially 190 degrees Fahrenheit, consisting of thoroughly mixing substantially sixty percent by weight of polymerized vinyl acetate with substantially forty percent by weight of an extracted pine wood pitch resin characterized by substantial insolubility in cold petroleum hydrocarbons obtained by first extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

JOHN E. ROBINSON.